June 21, 1960 C. B. HARKER 2,941,676
APPARATUS FOR HANDLING FLEXIBLE WALLED BAGS
Filed Feb. 17, 1954 5 Sheets-Sheet 1
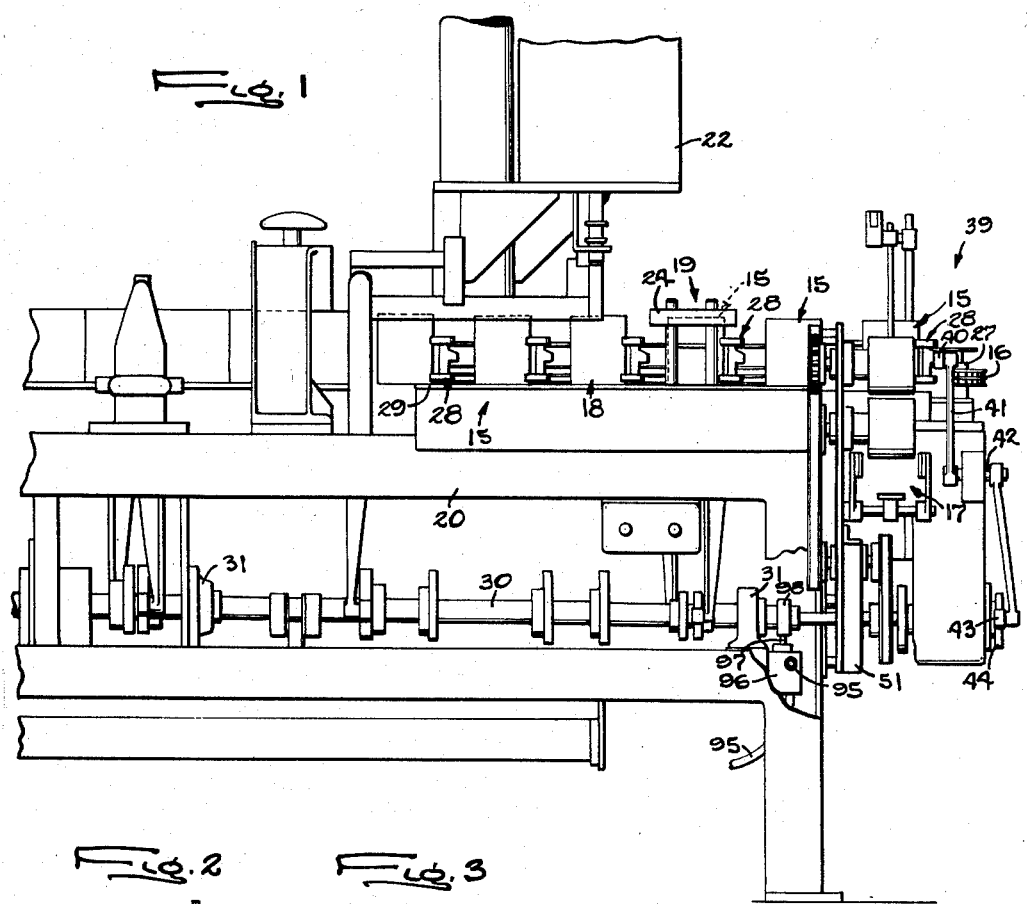
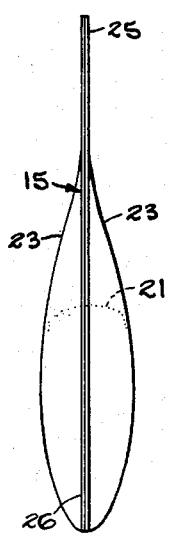
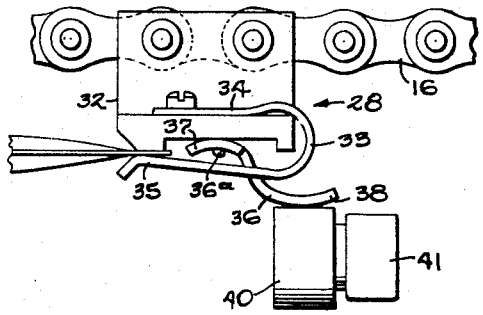
INVENTOR
Charles B. Harker
By Cullen, Pilger, Hubbard & Wolfe
ATTORNEYS

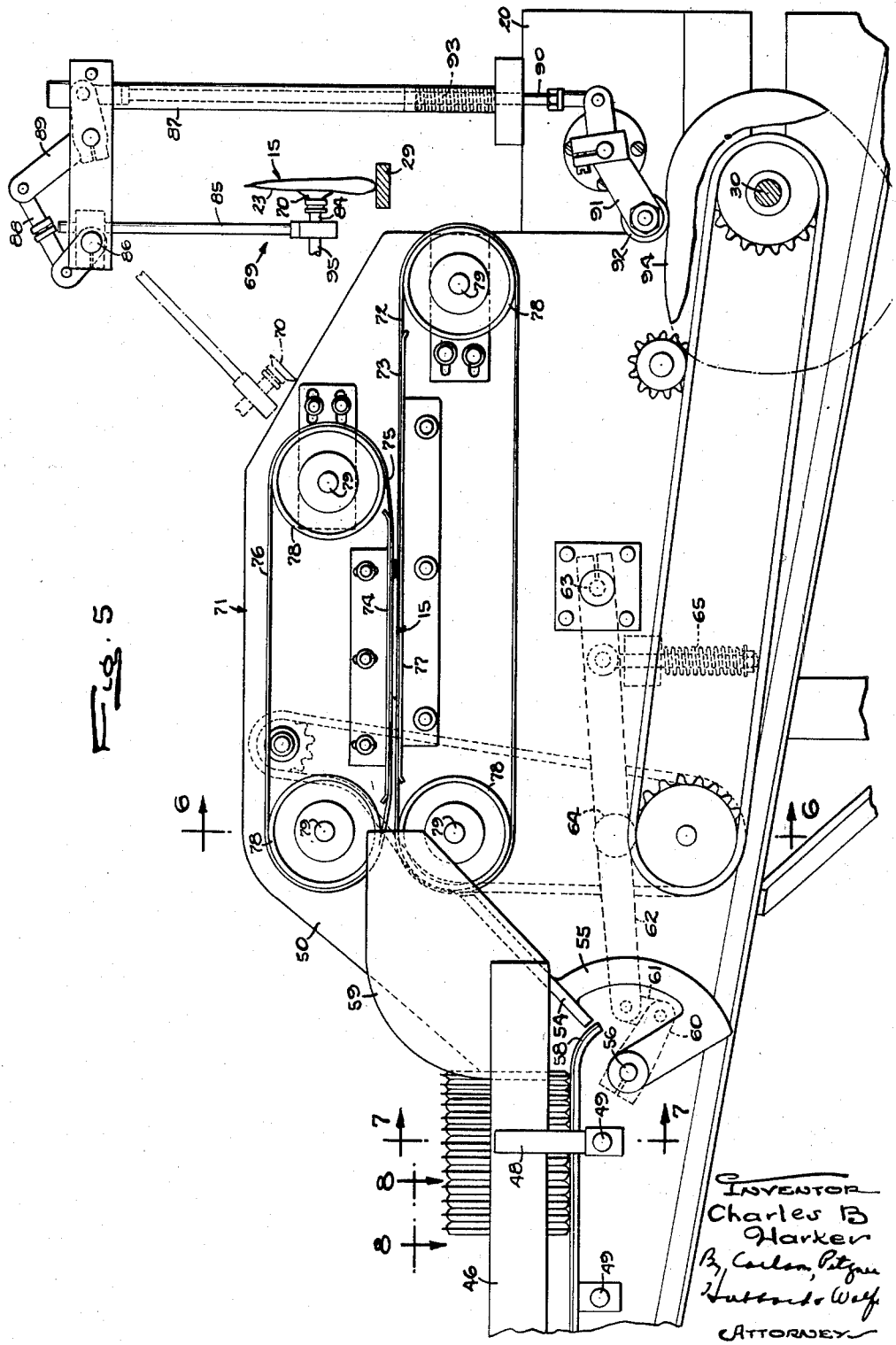

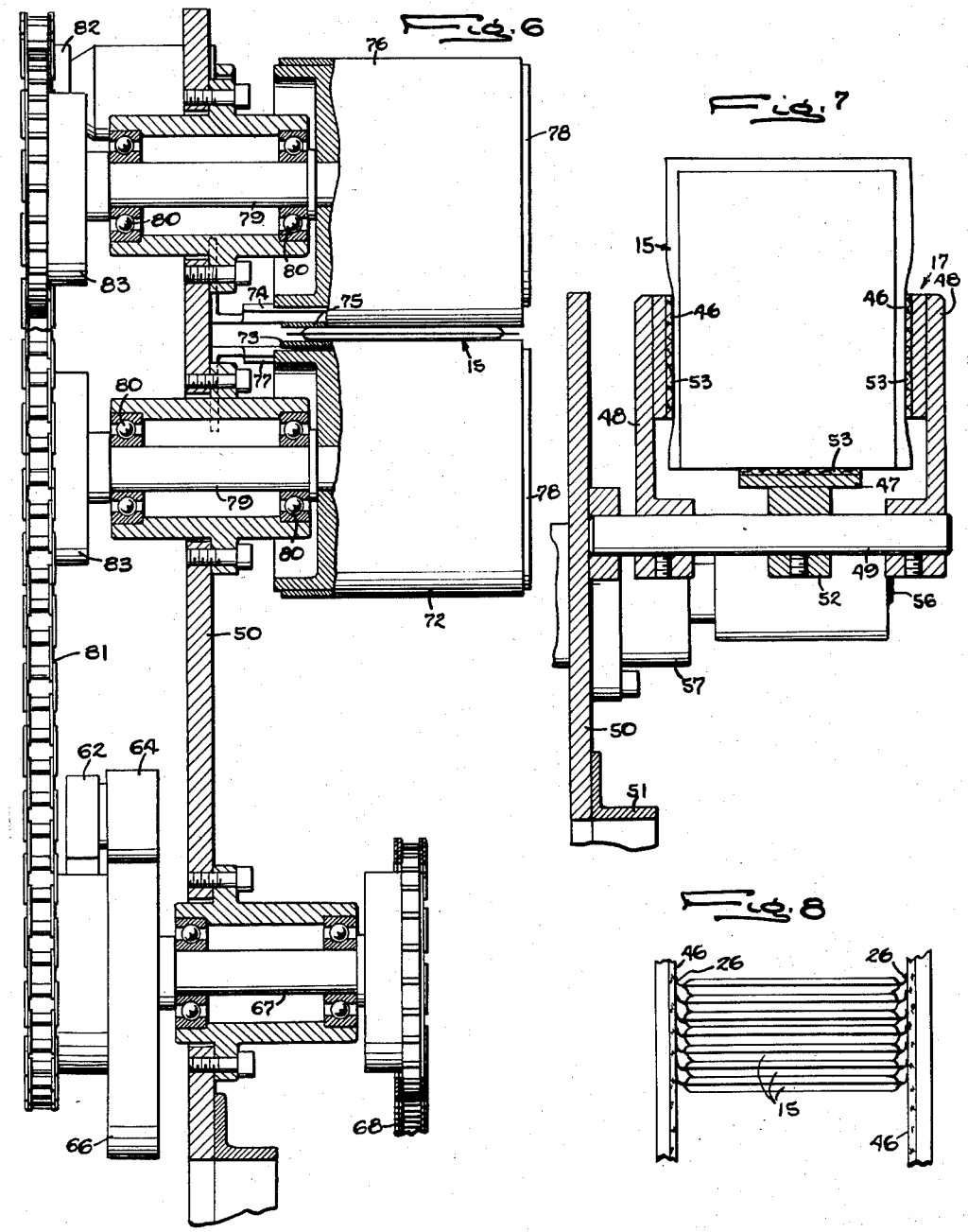

June 21, 1960
C. B. HARKER
2,941,676
APPARATUS FOR HANDLING FLEXIBLE WALLED BAGS
Filed Feb. 17, 1954
5 Sheets-Sheet 4
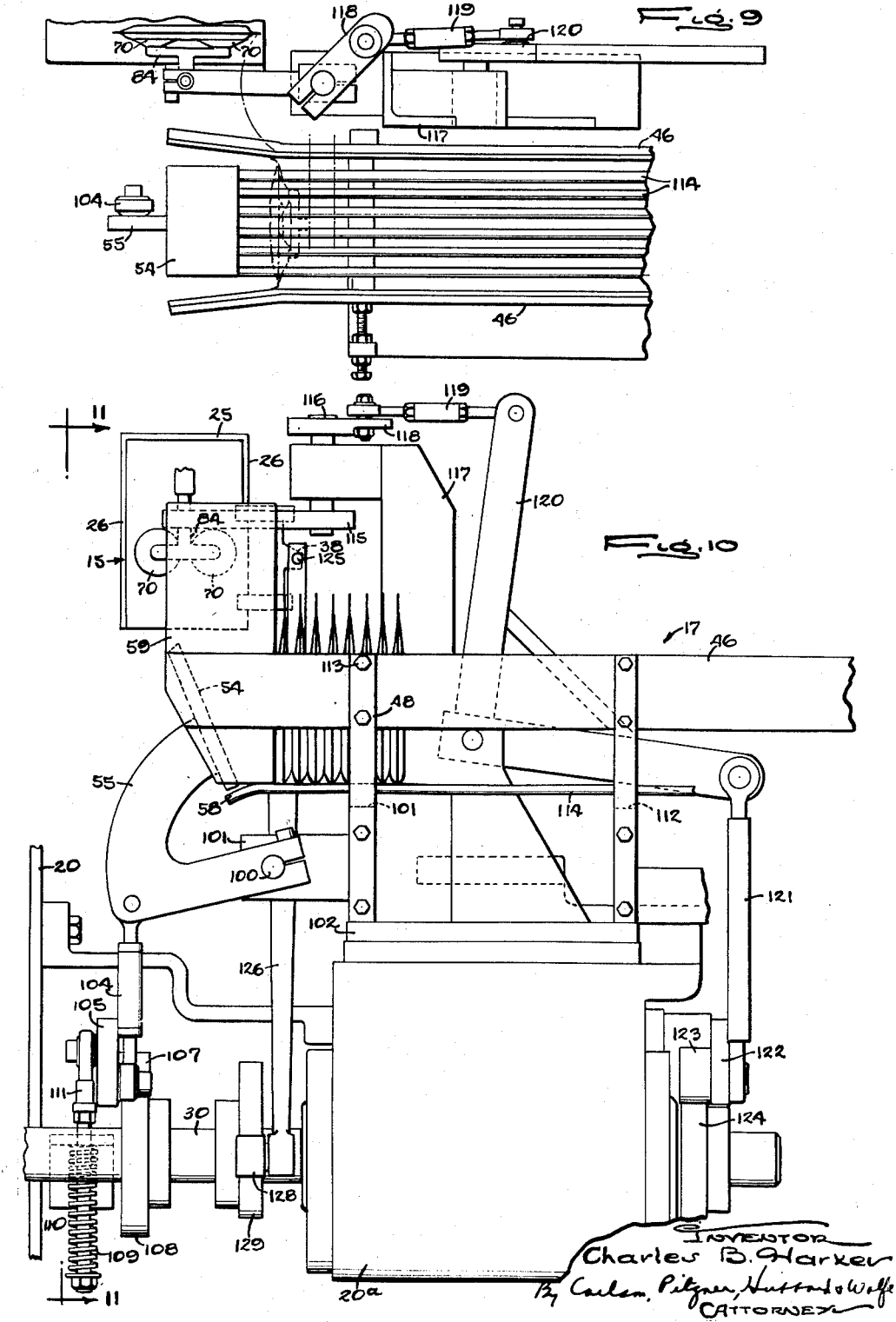

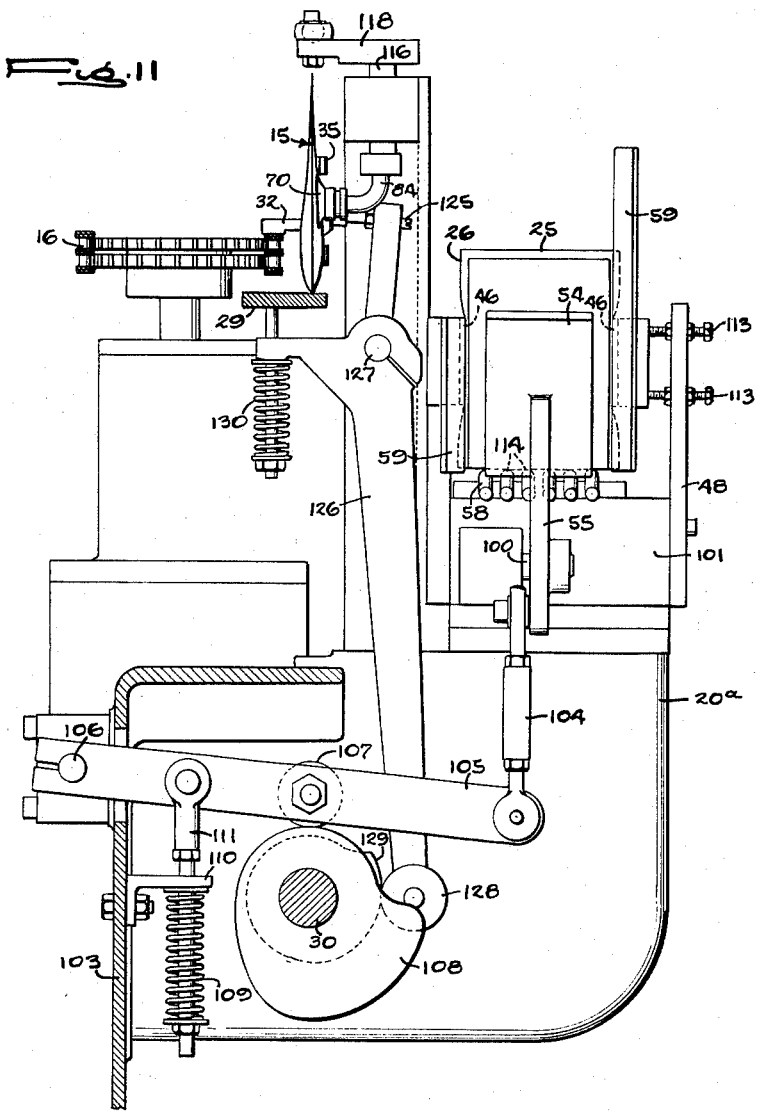

United States Patent Office 2,941,676
Patented June 21, 1960

2,941,676

APPARATUS FOR HANDLING FLEXIBLE WALLED BAGS

Charles B. Harker, Rockford, Ill., assignor, by mesne assignments, to Riegel Paper Corporation, New York, N.Y., a corporation of Delaware Filed Feb. 17, 1954, Ser. No. 410,969

7 Claims. (Cl. 214—7)

This invention relates to apparatus for handling flexible walled bags of flat, generally rectangular shape after the bags have been partially filled with loose material and closed. More particularly, the invention relates to apparatus for transferring filled flexible walled bags from a carrier by which they are advanced in upright positions and in edge to edge relation to a generally horizontal chute in which they are stacked face to face in upright positions.

One object of the invention is to construct the chute in a novel manner to retain the flexible walled bags in upright positions while permitting their advance in a broadwise direction along the chute and out an open exit end thereof.

Another object is to utilize the stiffness of the bags resulting from the presence of material therein for retention of the bags in the chute while avoiding deformation thereof by spaced frictional gripping members engageable with the side edges of each bag.

A further object is to transfer the bags one by one away from the carrier and advance the same broadwise between the gripping members by novel mechanism actuated in timed relation to the advance of the carrier.

A more detailed object is to take advantage of the flexible character of the bags to enable the same to be picked up by a swinging suction cup and transferred away from the carrier for delivery to a pusher and for advance by the latter broadwise into the chute.

The invention also resides in the novel manner of conditioning a succession of bags for proper retention between the gripping members of the chute and for subsequent insertion in cartons by distributing the packaged material evenly throughout the bags and thereby insuring that the latter are of substantially uniform width and thickness.

Other objects and advantages of the invention will become apparent from the following detailed description taken in connection with the accompanying drawings, in which Figure 1 is a fragmentary side elevational view of a packaging machine including bag transfer and stacking mechanism embodying the novel features of the present invention.

Fig. 2 is a side elevational view of a bag after the latter has been fitted and closed.

Fig. 3 is a view similar to Fig. 2 showing the bag after a flattening operation.

Fig. 4 is a fragmentary plan view of a clamp and releasing mechanism therefor.

Fig. 5 is a fragmentary side elevation of one form of transfer and stacking mechanism.

Figs. 6 and 7 are sectional views taken respectively along the lines 6—6 and 7—7 of Fig. 5.

Fig. 8 is a fragmentary plan view of the chute shown in Fig. 5.

Fig. 9 is a fragmentary plan view of a modified transfer and stacking mechanism.

Fig. 10 is a fragmentary side elevational view of the modified mechanism.

Fig. 11 is a sectional view taken along the line 11—11 of Fig. 10.

The apparatus shown in the drawings to illustrate the present invention is especially adapted for handling flat flexible walled bags 15 and transferring the same from edge to edge upright positions on a carrier 16 (Fig. 1) and into stacked side by side relation in a horizontally disposed chute 17 after the bags with their open ends up have been advanced by the carrier along a predetermined path and through successive filling and closing stations 18 and 19. At the latter, which are spaced along the top of an elongated frame 20, each bag is partially filled with a measured quantity of granular or powdered material 21 by a suitable filler mechanism 22 and then is closed as by pressing opposed side walls 23 of the bag together along their top edges between heated shoes 24 to form a top seal 25. Herein, the bag is generally rectangular in shape and comprises the side walls 23 which are formed of a suitable thermoplastic material and are joined together along a bottom fold and at their side edges by heat seals 26. As shown in Fig. 2, the bag contents 21, being loose, tend to settle in the lower and intermediate portions of the bag when the latter is first filled and in an upright position.

In the present instance, the carrier 16 is an endless chain of the ordinary roller type extending around sprockets 27 at spaced points along the frame 20 and having uniformly spaced therealong a plurality of clamps 28 which open rearwardly along the chain path to grip the leading side seal 26 of each bag and pull the same edgewise along a horizontal track 29 on which the bag bottom rests. Advance of the carrier intermittently to present each bag successively to the filling and closing stations 18 and 19 is effected by motions derived from a continuously rotating cam shaft 30 extending along the frame and journaled in spaced bearings 31. The manner of rotating the cam shaft and connecting the latter to the carrier is shown and described fully in Patent 2,649,674 to which reference may be made for further details.

Each clamp 28 (see Fig. 4) comprises a block 32 secured to extensions of the pivot pins of adjacent chain links and a sheet metal strip 33 of U-shaped cross section straddling the block and having one leg 34 bolted to the back side of the latter. The other leg is bifurcated and its trailing edge portions 35 constitute jaws which are urged against a back side of the block by the resilience of the strip, but which are movable away from the block by a lever 36. The latter is fulcrumed at 36ª on the block and is S-shaped with forked trailing end portions 37 extending between the front leg of the jaw strip and the block and fulcrumed on the latter to swing outwardly therefrom and move the jaws 35 to open the clamp in response to inward swinging of an outwardly inclined leading end portion 38 of the lever.

A lateral force for swinging the leading end portion 38 of each lever 36 to open the clamp 28 and release the bag 15 therein is applied at a release station 39 beyond the closing station 19 by a roller 40 (Fig. 4) carried by the upper end portion of another lever 41. This lever is pivoted at 42 (Fig. 1) on the frame 20 and carries a follower 43 which engages a cam 44 on the camshaft 30 (Fig. 1) for movement of the roller to open the clamp while the latter is dwelling at the release station 39.

Each filled bag 15 delivered by the carrier to the release station is picked up and is advanced broadwise into one end of the chute 17 which, in accordance with the present invention, is constructed in a novel manner to hold the bags frictionally in upright positions while maintaining the shape of the bags and permitting their broadwise advance along the chute and out through the open exit end (not shown) thereof. This is accomplished through the provision of elongated parallel gripping members 46 (Figs. 5, 7 and 8) which are spaced apart horizontally a distance correlated with but slightly less than the width of the bag by an amount sufficient to bend back the side seals 26 of each bag and thereby collapse the latter edgewise a small amount between the members as shown in Fig. 8. Herein, the gripping members are spaced apart a distance less than the spacing between the outer edges of the side seals 26 of the filled bags but greater than the spacing between the inner edges of these seals. Due to the presence of the loose material 21 in the bag, the side walls 23 and side seals 26 thereof are stiffened to provide sufficient friction between the seals and the gripping members to hold the bag in an upright position while it is advanced along the chute.

In the present instance, the gripping members 46 are flat parallel vertical side walls of the chute 17 having a width narrower than the height of the bags 15 and spaced above a horizontally disposed bottom 47. The side walls are elongated flat rails secured to the upper ends of two rows of posts 48 whose lower ends, in the form shown in Figs. 1 to 8, receive horizontal rods 49 projecting rigidly from a vertical plate 50 which extends outwardly from one side of the frame 20 and is supported on the latter by angle bars 51. Blocks 52 (Fig. 7) on the underside of the chute bottom 47 which also is a flat plate are secured on the rods 49 between the lower post ends, one of the latter being adjustable toward the other to vary the spacing between the side walls. To increase the friction between the bags and the chute walls, each of the latter may be coated with a thin layer 53 of suitable friction material such as cork.

Advance of each bag into gripping engagement with the side walls 46 of the chute 17 is effected by a pusher 54 which moves broadwise forth and back between a retracted position spaced from the entering end of the chute (Fig. 5) and an upright position between the side walls. In this instance, the pusher is a flat plate secured to one end of a V-shaped arm 55 which is fast at its other end on a rock shaft 56 extending horizontally beneath the chute end and the advanced position of the pusher and rotatably mounted in bearings 57 on the vertical chute support plate 50. When the pusher plate 54 is retracted, it is inclined upwardly away from the chute to receive a bag with one side wall of the latter lying along the upper side of the pusher. Downward sliding movement of a bag along the pusher is limited by a stop 58 which extends laterally of the plate to engage the bottom of the bag and which, in this instance, is defined by a downwardly curved extension of the chute bottom plate 47. A vertical guide plate 59 secured to and projecting upwardly and beyond one chute side wall 46 is spaced from and flares outwardly away from the chute support plate 50 and cooperates with the latter to guide each bag onto the pusher and into the entering end of the chute.

The pusher plate 54 is oscillated to advance bags 15 into the chute 17 in timed relation to release of bags at the release station 39 by a connection with the cam shaft 30. This connection, in the form shown in Figs. 1 and 5, comprises an arm 60 fast on the rock shaft 56 and connected through a link 61 to one end of a lever 62 which is pivoted at its other end at 63 on the vertical chute support plate 50 and which, intermediate its ends, carries a follower roller 64. A spring 65 acting between the support plate 50 and the lever 62 urges the follower 64 into engagement with a cam 66 (Fig. 6) fast on a shaft 67 rotatably mounted on the support plate in parallelism with the main cam shaft 30 and connected to the latter by a chain 68 extending around sprockets on the two shafts.

Novel mechanism 69 actuated in timed relation to the advance of the carrier 16 is provided for picking up each bag 15 as the same is released from the carrier at the release station 39 and transferring the bag away from the carrier to a position from which the bag is delivered to the pusher plate 54. This transfer mechanism includes a pair of suction cups 70 (Fig. 5) which are mounted to oscillate together between an advanced pickup position (shown in full in Fig. 5) of engagement with the exterior of one side wall 23 of a bag at the release station 39 and a retracted discharge position spaced laterally from the carrier 16 as shown in phantom in Fig. 5. Vacuum is applied to the suction cups to pick up each bag near the advanced position of the cups and before opening of the clamp 28 holding the bag and is maintained during transfer of the bag to the discharge position where it is released to permit the bag to drop by gravity away from the cups for delivery to the pusher plate 54.

In handling some bags 15 which are made of a very flexible material and whose contents 21 are quite loose so as to accumulate in the bottom part of each bag and bulge the side walls 23 as shown in Fig. 2 when the bag is filled, it is preferred, before the bags are delivered to the pusher plate 54, to subject the bags to a flattening operation by which the bags are made of uniform thickness and width as shown in Fig. 3 to achieve a pleasing appearance of the bags and insure proper gripping engagement of the same with the chute side walls 46. This is accomplished by spacing the pusher plate 54 from the discharge position of the suction cups 70 and interposing between the two a flattener 71 which, in the form of the invention shown in Figs. 1 to 8, is a part of the transfer mechanism 39 and which is constructed in a novel manner to take advantage of the fluid quality of the bag contents to distribute the same evenly throughout the bag.

In this instance, the flattener 71 includes an endless conveyor 72 (Fig. 5) having an upper straight run 73 which extends from a position below the discharge position of the suction cups 70 to receive each bag 15 as it is released from the cups to a position above and adjacent the retracted position of the pusher plate 54 for the advance onto the latter of each bag as it leaves the conveyor. The conveyor run 73 is horizontally disposed so that the contents of each bag lying flat thereon are free to flow to all parts of the bag. Cooperating with the conveyor 72 to squeeze and flatten each bag is a flat plate 74 beneath and along which the bag is carried by the conveyor and which is parallel to and spaced above the upper conveyor run 73 a distance equal approximately to the desired thickness of the bag.

To facilitate the passage of each bag 15 between the first conveyor 72 and the plate 74, a lower straight run 75 of a second endless conveyor 76 is extended along the under side of the plate and is advanced in unison with the upper run of the lower conveyor which is backed by a second plate 77, the upper conveyor 76 extending short of the discharge position of the cups. Herein, the conveyors 72 and 76 are belts extending around pulleys 78 which are mounted on shafts 79 journaled in bearings 80 on the chute support plate 50 for rotation about parallel horizontal axes. At one end of each of the conveyors, the pulley shafts 79 are connected to the pusher plate cam shaft 67 by a chain 81 extending around an adjustable idler sprocket 82 and sprockets 83 on the cam shaft and the pulley shafts.

The suction cups 70 preferably are made of soft flexible material such as rubber and are mounted on the ends of horizontally disposed tubes 84 rigid with the lower end of a depending arm 85 of a bell crank lever swingable about a horizontal pivot 86 on a post 87 upstanding from the frame 20. Such swinging is effected herein through a link 88 and a second bell crank 89 fulcrumed on the post and connecting the other end of the first bell crank with the upper end of a slide 90 which is guided for vertical movement on the frame. At its lower end, the slide is connected to one end of another bell crank 91 which is fulcrumed on the frame and whose other end carries a follower roller 92. A spring 93 urges the slide upwardly and the follower downwardly into engagement with a cam 94 fast on the main cam shaft 30 and adapted to raise the follower and lower the slide to swing the suction cups 70 outwardly away from the carrier. As the follower rides off of the high point of the cam 94, the slide 90 is raised and the cups swing downwardly into their advanced position for engagement with the side wall 23 of a bag 15 at the release station.

Vacuum is applied to the suction cups 70 through flexible conduits 95 connected to the rigid tubes 84 supporting the cups and to a source of vacuum (not shown) through a valve 96 which is mounted on the frame 20 and whose actuator 97 (Fig. 1) is engaged by a cam 98 fast on the camshaft 30. The cam is adapted to open the valve 96 to apply the vacuum in the final approach of the cups to a bag at the release station and to hold the valve open until the cups have moved into their discharge position. Then, the valve is closed and the vacuum is relieved to release the bag which drops into a horizontal position on the lower conveyor 72 of the flattener 71.

In handling other types of bags whose walls are stiffened somewhat so as to tend to retain their shape when filled while remaining flexible for frictional engagement with the side walls of the chute 17, each bag 15 picked up from the carrier 16 by the suction cups 70 is transferred directly from the latter to the pusher plate 54. This is accomplished in a modified form of bag transfer and stacking mechanism shown in Figs. 9 to 11 by disposing the pusher plate directly below the discharge position of the suction cups so that, when the bag is released by the cups, it drops onto the upwardly inclined surface of the plate and slides along the latter until its bottom engages the stop 58. To reduce the space occupied by the machine, the chute 17 shown in Figs. 9 to 11 extends longitudinally of the path of the carrier 16.

In the modified construction of Figs. 9 to 11 the V-shaped pusher plate arm 55 is pivoted at 100 on a block 101 upstanding rigidly from a horizontal plate 102 forming a part of a forward extension 20ᵃ of the frame 20 secured to the latter by a bracket 103. Intermediate its ends, the arm 55 is connected by an adjustable link 104 (Fig. 11) to one end of a lever 105 whose other end is pivoted at 106 on the frame bracket 103 and which, intermediate its ends carries a follower roller 107 engageable with a cam 108 on the cam shaft 30. The lever is urged downwardly by a spring 109 acting between a bracket 110 on the frame and an abutment on a link 111 extending through the bracket and pivotally connected to the lever.

The posts 48 supporting the flat parallel side rails 46 to the chute 17 are bolted to opposite ends of the block 101 for the pusher and a similar block 112 upstanding rigidly from the frame plate 102. One side wall 46 of the chute is mounted on its posts 48 through bolts 113 for adjustment of the wall horizontally toward and away from the other wall to accommodate bags of different widths. To guide bags in their descent along the pusher 54, vertical plates 59 preferably are secured to the entering end portions of both of the chute side walls 46, the upper end of the plate 59 adjacent the carrier 16 being cut away as shown in Fig. 11 to permit the bags to swing over this plate. At their entering ends, the chute side walls 46 flare outwardly away from each other as shown in Fig. 9 to guide each bag into the chute. The bottom 47 of the chute in this instance comprises a plurality of parallel horizontal rods 114 mounted on the tops of the blocks 101 and 112 and curved downwardly at the entering end of the chute to underlie the pusher plate 54 and provide the stop 58.

Supporting the suction cups 70 for swinging about their vertical axis is an arm 115 which carries the rigid tubes 84 for the cups at its outer end and which is fast at its inner end on the lower end of a vertical rock shaft 116 journaled in bearings in a post 117 secured to and upstanding from the frame extension 20ᵃ. Herein, the rock shaft is disposed slightly ahead of the release station 39 and laterally from the carrier path so that the cups 70 in swinging away from the latter move first rearwardly and then outwardly and forwardly of the path. An arm 118 fast on the upper end of the rock shaft is connected through a link 119, a bell crank 120, and a link 121 to a spring urged lever 122 which is similar to the lever 105 described above and which carries a follower roller 123 at its lower end. The follower engages a cam 124 fast on the main camshaft 30 and adapted to swing the cups from their advanced position of engagement with one wall of a bag at the release station as shown in full in Figs. 9 and 10 and into their discharge position above the pusher plate 54 as shown in phantom in Fig. 9. When the follower 123 rides onto a fall of the cam 124, the cups are swing into their advanced position. Vacuum is applied to and released from the suction cups in the manner described above through the valve 96 which is actuated by the cam 98 on the camshaft 30.

To release each bag at the release station 39, the projecting portion 38 (Figs. 10 and 11) of the lever 36 is moved inwardly toward the clamp block 32 by a finger 125 in the form of a bolt threaded into the upper end of a lever 126 pivoted at 127 on the frame extension 20ᵃ and carrying a follower roller 128 engageable with a cam 129 on the main camshaft 30. A spring 130 acting between the frame and the lever urges the follower 128 into engagement with the cam 129.

*Operation*

In the operation of the novel bag transfer and stacking mechanism described above in connection with Figs. 1 to 8, let it be assumed that the camshaft 30 is rotating continuously and that bags 15 which have been filled and closed at the stations 18 and 19 are being advanced to the release station 39 one by one by the carrier 16. During approach of a bag to the release station, the follower 92 (Fig. 5) rides off from a high position of the cam 94 and the suction cups 70 begin to swing out of their retracted position and downwardly toward their advanced position shown in Fig. 5. After the clamp 28 for each bag has passed such advanced position, final movement of the cups into the latter is completed. Next, after vacuum is applied to the cups by opening of the valve 96, the cam 44 swings the clamp release roller 40 into engagement with the lever 36 to swing the jaws 35 outwardly to open the clamp and release the bag which is now held by suction in engagement with the cups.

Following release of the bag by opening of the clamp 28, the cam 94 swings the suction cups 70 laterally of and outwardly away from the carrier path and into their discharge position shown in phantom in Fig. 5 in which the bag is tilted away from the vertical and toward the chute. During such lateral movement of the cups, the leading edge portion of the bag is bent laterally and rearwardly as permitted by the flexible character of the bag walls 23 and the whole bag is canted slightly due to the flexibility of the cups 70 to enable the leading edge of the bag to move past the jaws 35. The vacuum is relieved from the cups after the latter reach their discharge position and the bag drops by gravity onto the upper run 73 of the lower flattener conveyor 72 which, along with the lower run 75 of the upper conveyor 76, is being advanced continuously toward the pusher plate 54 and the chute 17 through its connection with the auxiliary camshaft 67.

Each bag dropped from the cups 70 falls into a horizontal position on the upper run 73 of the lower conveyor 72 and is carried by the latter between the conveyors and the flattener plates 74 and 77. In the movement of the bag with the conveyors between the plates, the bag contents 21 are free to flow to all parts of the bag due to the horizontal position of the latter and the bag side walls 23 are squeezed together so that the loose material tends to become packed. The bag, upon reaching the end of the upper run of the lower conveyor 72 moves downwardly around the adjacent pulley 78 and slides off from the conveyor and downwardly along the pusher plate 54 until its bottom abuts the curved extension 58 of the chute bottom 47.

With the bag 15 lying flat against the upper side of the pusher plate 54, the cam 66 swings the latter upwardly and around the curved extension 58 and broadwise between the chute side walls 46. The latter being spaced apart a distance slightly less than the width of the bag, the bag side seals 26 are folded rearwardly and squeezed inwardly slightly but, due to the rigidity afforded by the material 21 in the bag, tend to retain their shape and grip the chute walls frictionally. In this way, the bag is retained in an upright position and may be advanced broadwise along the chute 17 and out the open exit end thereof without becoming deformed. As each bag is positioned in the entering end of the chute, the preceding bags stacked therein are shifted step by step along the chute. Since the bags tend to retain their shape in the chute, they leave the latter in substantially the same condition that they were in upon entering, that is, having uniform thickness and width due to the action of the flattener 71, so that they are pleasing in appearance and may be inserted easily into cartons.

In the operation of the modified stacking and transfer mechanism shown in Figs. 9 to 11, the timing of the release of each bag from the carrier 16, the pick-up by the suction cups 70, and the outward swinging of the cups laterally away from the carrier is the same as described above, the cam 123 on the camshaft 30 swinging the cups outwardly after the cam 129 has swung the finger 125 inwardly to shift the jaws 35 outwardly and open the clamp 28. The cups in their arcuate swinging about the rockshaft 116 move first rearwardly and outwardly and then forwardly to their discharge position, such rearward movement facilitating passage of the leading side seal of the bag past the clamping jaw 35. When the cups reach their retracted position above the pusher plate 54 as shown in phantom in Fig. 9, the vacuum is relieved by closing the valve 96 and the bag held by the cups is released to drop directly onto the pusher plate and slide along the latter and into engagement with the stop 58. With the bag lying flat against the plate and its bottom supported by the stop 58, the cam 108 swings the pusher upwardly and through the adjacent chute end to push the bag broadwise and into an upright position between the chute side walls 46 which retain the bag frictionally while permitting its advance along the chute.

I claim as my invention:

1. In apparatus for handling generally rectangular flexible walled bags, the combination of, a carrier movable step by step along a predetermined path and having spaced clamps opening along the path and gripping edge portions of said bags to advance the same edgewise along the path, means operable at one position of said carrier and while the latter is dwelling to open the clamp and release the bag at such position, a suction cup for gripping the side wall of a bag in said releasing position, transfer mechanism including a member supporting said cup and moving the same transversely of said path into engagement with a bag to grip the bag and move it to a dropping position spaced from the path, and means for actuating said mechanism in timed relation to the advance of said carrier and operable to move said cup into engagement with the side wall of a bag at said release position during a dwell of the conveyor and before said clamp is opened and then to move the cup laterally to said dropping position, and means for applying and releasing the vacuum on said cup in timed relation to the advance of said carrier and operable to apply the vacuum before said clamp is opened and to release the vacuum when the cup reaches said dropping position.

2. In apparatus for handling flat generally rectangular flexible walled bags partially filled with loose material and closed, the combination of, a generally horizontal chute having parallel side walls spaced apart a distance correlated with and slightly less than the width of said bags to grip each bag frictionally by engaging and depressing the side edges of the bag, a generally flat pusher plate fulcrumed on a horizontal axis beneath one end of said chute and normally disposed in an inclined retracted position extending upwardly and away from said chute end, a stop positioned adjacent the lower end of said plate to limit sliding movement of a bag downwardly along the plate by engaging the bottom edge of the bag, and means for swinging said plate and a bag supported thereon from said retracted position upwardly and broadwise through said chute end to an upright position between said walls and then returning the plate to the retracted position to leave the bag wedged between the walls in said upright position.

3. In apparatus for handling flat generally rectangular flexible walled bags having loose material therein, the combination of, a carrier for supporting a plurality of generally flat partially filled flexible walled bags and advancing the same edgewise along a predetermined path to a release position, a horizontally disposed chute having one end spaced from said release position and having rigid parallel side walls spaced apart a distance less than the width of said bags to grip the side edges thereof frictionally and hold the bags in upright positions in the chute, mechanism for flattening each of said bags and distributing the contents thereof evenly throughout the bag, said mechanism comprising a conveyor having horizontally disposed straight run alined with said chute and spaced at opposite ends from said chute end and from said carrier release position and a member spaced above the conveyor run and cooperating therewith to flatten bags advanced along the run, a suction cup engageable with one side wall of the bag at said release position, means supporting said cup for swinging laterally away from said path and about a horizontal axis to a discharge position which is disposed above the adjacent end of said conveyor run and in which a bag supported by the cup is tilted away from the vertical, and a pusher movable back and forth between the other end of said conveyor run and said chute end to receive each flattened bag from said conveyor and advance the same broadwise to upright positions between said chute walls.

4. In apparatus for handling flat generally rectangular flexible walled bags having loose material packaged therein, the combination of, a flattener comprising a horizontally disposed conveyor straight run and a member spaced above the conveyor and cooperating therewith to flatten bags advancing along the conveyor, a horizontal chute spaced at one end from one end of said conveyor and having rigid parallel side walls spaced apart horizontally a distance less than the width of bags flattened between said conveyors, means for advancing said conveyor to carry bags deposited in horizontal positions thereon toward said chute and beneath said member to distribute the loose material evenly throughout each bag and thereby flatten the latter, a pusher plate inclined downwardly from said end of said conveyor to receive bags dropped from the latter, and means supporting said plate for movement into and out of said chute end to advance a bag on the plate broadwise between the rails and leave the bag supported in an upright position by frictional engagement between its side edges and said walls.

5. In apparatus for handling flexible walled generally rectangular bags having loose material therein, the combination of, a horizontally disposed conveyor for supporting a bag in a horizontal position and advancing the same to a discharge position, material distributing means cooperating with said conveyor to distribute the bag contents throughout all portions of the bag while the latter is supported by the conveyor, a horizontally disposed chute having one end disposed adjacent but spaced from said discharge position and a pusher disposed at said discharge position and between said conveyor and said chute end and movable back and forth between the two to receive each flattened bag from the conveyor and push the same broadwise into the chute, said chute having side walls spaced apart laterally a distance slightly less than the width of a bag with its contents distributed by said member whereby the side edges of the bag are depressed and gripped frictionally by the side walls as the bag advances broadwise between the walls.

6. The combination of, a carrier adapted to support a plurality of flexible walled bags and advance the same edgewise along a predetermined path to release position, a suction cup swingable back and forth about a vertical axis from a position of engagement with the side wall of a bag at said release position and through approximately a quarter revolution to a drop position spaced from said path, a generally horizontal chute adapted to support a stack of said bags side by side in upright positions and extending longitudinally of said path with one end disposed adjacent said drop position, said chute having spaced side walls, a pusher plate fulcrumed on a horizontal axis beneath said end of said chute and normally inclined upwardly and away from the chute end in a retracted position below said drop position of said cup, means for swinging said plate upwardly and broadwise through the chute end to an upright position between said walls, and means for swinging said suction cup and applying and releasing the vacuum on the cup in timed relation to the advance of the carrier to pick up each filled bag delivered to said release position, transfer the same to the drop position, and release the bag to fall onto said plate for transfer to said chute.

7. The combination of, a carrier adapted to support a plurality of flexible walled bags and advance the same edgewise along a predetermined path to a release position, a horizontally disposed chute adapted to support a stack of said bags side by side and extending longitudinally of said path with one end disposed adjacent but spaced laterally of said path from said release position, and mechanism for transferring a bag laterally away from said path and said release position and into said chute through said end thereof, said mechanism including a suction cup swingable back and forth about a vertical axis from a position of engagement with the side wall of a bag in said release position and through approximately a quarter revolution to a discharge position in alinement with said end of said chute and means for swinging said cup and applying and releasing vacuum on the cup in timed relation to advance of said carrier.

References Cited in the file of this patent

UNITED STATES PATENTS

| | | |
|---|---|---|
| 973,422 | Gifford | Oct. 18, 1910 |
| 1,985,323 | McCall | Dec. 25, 1934 |
| 1,991,760 | McEver et al. | Feb. 19, 1935 |
| 2,169,166 | Rober et al. | Aug. 8, 1939 |
| 2,224,975 | McNamara | Dec. 17, 1940 |
| 2,307,822 | Clegg | Jan. 12, 1943 |
| 2,452,020 | Straw | Oct. 19, 1948 |
| 2,649,674 | Bartelt | Aug. 25, 1953 |
| 2,682,216 | Shields | June 29, 1954 |
| 2,844,917 | Caldwell | July 29, 1958 |

FOREIGN PATENTS

| | | |
|---|---|---|
| 760,501 | France | Dec. 14, 1933 |